United States Patent
Shum et al.

(10) Patent No.: US 6,865,645 B1
(45) Date of Patent: Mar. 8, 2005

(54) PROGRAM STORE COMPARE HANDLING BETWEEN INSTRUCTION AND OPERAND CACHES

(75) Inventors: Chung-Lung Kevin Shum, Poughkeepsie, NY (US); Dean G. Bair, Bloomington, NY (US); Charles F. Webb, Poughkeepsie, NY (US); Mark A. Check, Hopewell Junction, NY (US); John S. Liptay, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 09/677,527

(22) Filed: Oct. 2, 2000

(51) Int. Cl.[7] ................................................ G06F 12/00
(52) U.S. Cl. ........................ 711/123; 711/124; 711/125; 711/126
(58) Field of Search .................... 711/123–126, 117, 711/118, 119, 146

(56) References Cited

U.S. PATENT DOCUMENTS

| | | | | |
|---|---|---|---|---|
| 3,735,360 A | * | 5/1973 | Anderson et al. | 711/149 |
| 5,787,477 A | | 7/1998 | Rechtschaffen et al. | 711/141 |
| 5,930,821 A | * | 7/1999 | Gaskins et al. | 711/146 |
| 6,014,690 A | | 1/2000 | VanDoren et al. | 709/215 |
| 6,018,791 A | | 1/2000 | Arimilli et al. | 711/141 |
| 6,021,468 A | | 2/2000 | Arimilli et al. | 711/122 |
| 6,073,217 A | * | 6/2000 | Mahalingaiah et al. | 711/146 |

OTHER PUBLICATIONS

Jim Handy, The Cache Memory Book, 1998, Academic Press, p 57.*

* cited by examiner

Primary Examiner—Gary Portka
Assistant Examiner—John M. Ross
(74) Attorney, Agent, or Firm—Lynn Augspurger; Cantor Colburn LLP

(57) ABSTRACT

A method of supporting programs that include instructions that modify subsequent instructions in a multi-processor system with a central processing unit including an execution unit, and instruction unit and a plurality of caches including a separate instruction and operand cache.

25 Claims, 1 Drawing Sheet

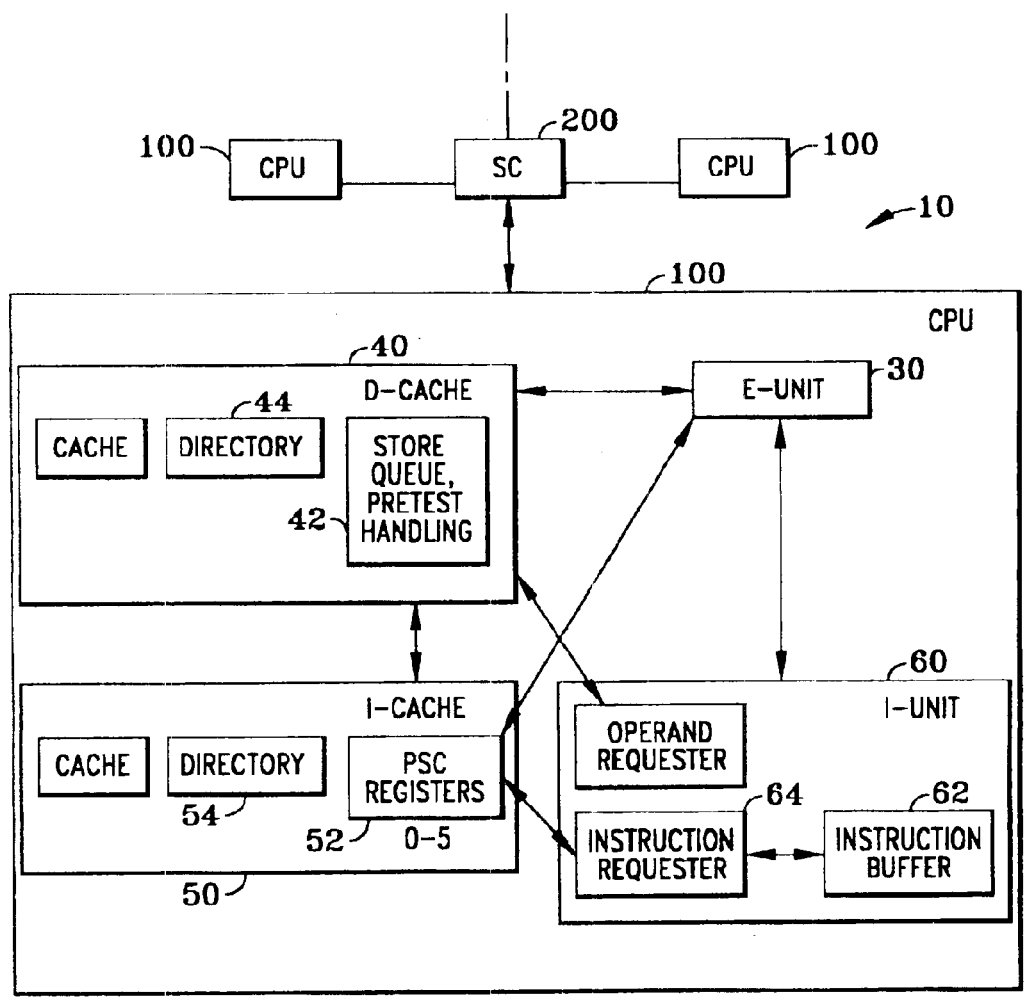

PROGRAM STORE COMPARE HANDLING BETWEEN INSTRUCTION AND OPERAND CACHES

BACKGROUND

The basic structure of a conventional multi-processor computer system has several central processing units which are interconnected and connected to common memory such as random-access memory or (RAM) through a storage controller. Such a computer system may have many additional components such as additional memory, and various I/O such as serial and parallel ports for connection to, e.g., modems or printers.

In a multi-processor computer system, all of the central processing units are generally identical; that is, they all use a common set or subset of instructions and protocols to operate and generally have the same architecture. A central processing unit includes a processor core having a plurality of registers, instruction unit which fetches, decodes and issues program instructions, and execution unit, which carry out program instructions in order to operate the computer. The central processing unit may also have one or more caches, such as an instruction cache and a data cache, which are typically implemented using high-speed memory devices. Caches are commonly used to temporarily store values that might be repeatedly accessed by an execution unit, and instruction unit, in order to speed up processing by avoiding the longer step of loading the values from memory (not shown). These caches are referred to as "on-board" or level 1 (L1) when they are integrally packaged with the processor core on a single integrated chip.

A central processing unit in multi-processor system may also include additional caches, such as a level 2 (L2) cache since it supports the on-board (L1) caches and. Where, an L2 cache acts as an intermediary between memory and the on-board caches and, and can usually store a much larger amount of information (instructions and data) than the on-board caches can, but at a longer access time penalty. For example, an L2 cache may be a chip having a storage capacity of 256 or 512 kilobytes, while the central processing unit may have on-board caches with 64 kilobytes of total storage. Although only a two-level cache hierarchy is discussed, multilevel cache hierarchies can be provided where there are many levels (L3, L4, etc.) of serially connected caches.

In a multiprocessor computer system, it is important to provide a coherent memory system, that is, to cause writes to each individual memory location to be serialized in some order for all central processing units. For example, assume a location in memory is modified by a sequence of write operations to take on the values: 1, 2, 3, 4. In a cache-coherent system, all central processing units will observe the writing to a given location to take place in the order shown. However, it is possible for a central processing unit to miss observing a write to the memory location. A given central processing unit reading the memory location could see the sequence 1, 3, 4, missing the update to the value 2. A multiprocessor system that implements these properties is said to be "coherent."

SUMMARY OF THE INVENTION

A method of supporting programs that include instructions that modify subsequent instructions in a multi-processor system with a central processing unit including an execution unit, an instruction unit, and a plurality of caches including a separate instruction and operand cache. The method subjects an instruction cache and operand cache of a central processing unit to a cache coherency protocol with interlocks on cache block access. The cache coherency protocol allows shared access by the instruction cache and the operand cache to a cache block if it has read only status. In addition, the cache coherency protocol allows access by the operand cache and prevents access by the instruction cache to a cache block if it has exclusive status.

The cache coherency protocol includes interfaces with a multi-processor system storage controller employing a multi-processor cache coherency protocol as well as interfaces with existing cache handling requirements.

DESCRIPTION OF THE DRAWINGS

The FIGURE illustrates a multi-processor system configuration.

The detailed description explains the preferred embodiments of the invention, together with advantages and features, by way of example with reference to the drawings.

DETAILED DESCRIPTION

In a multi-processor computer system, all of the central processing units are generally identical; that is, they all use a common set or subset of instructions and protocols to operate and generally have the same architecture. The FIGURE depicts a multi-processor system 10 including separate instruction cache (I-cache) 50 and Data or Operand cache (D-cache) 40. A central processing unit 100 includes a processor core having a plurality of registers, instruction unit 60 which fetches, decodes and issues program instructions, and execution unit 30, which carry out program instructions in order to operate the computer. The central processing unit 100 may also have one or more caches, such as an instruction cache 50 and a data cache 40, which are typically implemented using high-speed memory devices.

There are a number of protocols and techniques for achieving the previously mentioned cache coherence that are known to those skilled in the art. At the heart of all these mechanisms for maintaining coherency is the requirement that the protocols allow only one central processing unit 100 to have a "permission" that allows a write to a given memory location (cache block) at any given point in time. As a consequence, whenever a particular central processing unit 100 attempts to write to a memory location, it must first inform all other central processing units 100 of its desire to write to the location and receive permission from all other processing elements to carry out the write. On the other hand, if a particular central processing unit 100 attempts to read from a memory location, it must inform at least the central processing unit 100 currently having write permission to the subject memory location, and receive permission to carry out the read.

This communication is necessary because, in systems with caches, the most recent valid copy of a given block of memory may have moved from the system memory to one or more of the caches in the system. If a central processing unit 100 attempts to access a memory location not present within its cache hierarchy, the correct version of the block, which contains the actual (current) value for the memory location, may be either in the system memory or in one of more of the caches in another central processing unit 100. If the correct version is in one or more of the other caches in the system, it is necessary to obtain the correct value from the cache(s) in the system instead of system memory.

To achieve this, the cache-coherence protocol associates with each block in each level of the cache hierarchy, a status indicator indicating the current "state" of the block. Therefore, a central processing unit 100 can determine by communicating with other central processing units 100 (distributed) or through the SC 200 (centralized), whether any other central processing unit 100 in the system has a copy of the block. If no other central processing unit 100 has an active copy of the block, the reading central processing unit 100 marks the state of the block as "exclusive". If a block is marked exclusive, it is permissible to allow the central processing unit 100 to later write the block without first communicating with other central processing units 100 in the multi-processor system 10 because no other central processing unit 100 has a copy of the block. Therefore, it is possible for a central processing unit 100 to write a location without first communicating this intention, but only where the coherency protocol has ensured that no other central processing unit 100 has an interest in the block.

In a preferred embodiment of the present invention a microprocessor that contains separate caches for instructions (I-cache) 50 and operand (D-cache) 40 provides support for programs that store into (or modify) their own instruction streams.

The FIGURE depicts a multi-processor system 10 including separate instruction cache (I-cache) 50 and Data or Operand cache (D-cache) 40. The primary concept is that the I-cache 50 and D-cache 40 are treated as if they were caches of different central processing units 100, and thus are subject to a similar cache coherency protocol. As stated earlier, one skilled in the art will appreciate that in its typical application, a cache coherency protocol mandates that in a multi-processor system 10, only a single central processing unit 100 can have exclusive status, that is, write capability to a particular a cache block location at one time. In a preferred embodiment, a similar protocol is applied, within a processor system 10. Where the multi-processor system 10 employs separate instruction and operand caches (50, 40) but there is no distinction between instruction and data memory, to address the application of programs that modify their own instructions. Thus, a cache block can only be shared by (and resides in) both I-cache 50 and D-cache 40 only if it has "read-only" status. If the block has "exclusive" status in the D-cache 40, there will not be any copy of that block in the I-cache 50.

Referring once again to the FIGURE the I-cache 50 includes and address-based register-file termed the Program Store Compare (PSC) registers 52. The PSC registers remember the physical (cache block) addresses of any "prefetched" instructions that have been fetched for execution but not yet executed. Since these are instruction data, they are resident in the I-cache 50 with "read-only" status. Whenever the D-cache 40 receives a store pretest request from the instruction unit 60 to prepare for an operand store, the D-cache 40 obtains "exclusive" status ownership of that storage block so that the corresponding instruction will be allowed to modify it. If the block is not already owned by the D-cache 40 with "exclusive" status, the D-cache 40 acquires "exclusive" rights to the block from the storage controller (SC) 200. As part of the process of obtaining "exclusive" status for that block, the D-cache 40 sends an internal program store compare cross-interrogate (PSC-XI) to probe the I-cache 50 with the address of that block.

The I-cache 50 searches its directory 54 with the probing address, and invalidates that block if it is found in the I-cache 50. In addition, the physical location of the block being invalidated (if any) is compared to those of any valid PSC registers. If there is any match, then a "PSC-XI hit" indication is sent back to the D-cache 40 with the response to the PSC-XI; if there is no match, the PSC-XI response is sent with no "PSC-XI hit" signal.

The D-cache 40 waits for both the exclusivity response from SC 200 and the PSC-XI response from I-cache 50 before allowing the operand store operation to be processed. This hierarchy guarantees that the "PSC-XI hit" indication, if any, is received before the operand store operation is complete. If the PSC-XI had responded with a "PSC-XI hit", any "prefetched" instructions are discarded, re-fetched, and redecoded after the store operation is complete.

When the I-cache 50 receives an instruction fetch request, the I-cache 50 obtains "read-only" ownership of that storage block. If the block is already in the I-cache 50, it cannot be in D-cache 40 with "exclusive" status (by protocol). If the block is not already in the I-cache 50, the I-cache 50 requests the block from the SC 200; if the SC 200 finds that there is an "exclusive" copy of that block anywhere in the multi-processor system 10, including the D-cache 40 of the same central processing unit 100, that copy is invalidated using regular cross-interrogate before granting "read-only" access for that block to the requesting I-cache 50.

Applying the abovementioned methodology, any time a program modifies its instruction stream, the instructions executed after the modification will reflect that modification. Any instructions "prefetched" before the store was executed which might have been affected by the store are purged, re-fetched and redecoded. Upon being re-fetched, the updated copy of storage is obtained, the store having been propagated through the D-cache 40 into the SC 200.

The PSC registers 52 are used to remember physical addresses of any "prefetched" instructions. In the preferred embodiment, there is a total of six locations in the I-buffer 62, and six I-buffer requesters 64. That means, there will be a total of six PSC registers 52. It is noteworthy that, six registers 52 are chosen because there are a total of six possible prefetched addresses in the I-buffer 62 for the micro-architecture pipeline chosen. One skilled in the art will appreciate that the number of registers available is not of significant importance, provided that there is always a sufficient number to include all the prefetched address locations in the particular pipeline architecture. In fact, it is likely that there would be numerous variations to the invention that would be conceived by those skilled in the art, which would be reasonable and within the scope of this invention.

Each PSC register 52 is set up at each instruction fetch request according to its corresponding I-buffer requester ID. Each PSC register 52 contains the Cache Congruence Class address and the corresponding Set ID for the instruction in the I-buffer 62 in the I-cache directory 54 and becomes valid after a double word (DW) of instruction data is returned to the instruction unit (I-unit) 60.

To support integration with existing pipelined architecture a clear_psc line is provided from the I-unit 60 for each I-buffer requester ID. The clear_psc line is provided to invalidate the corresponding PSC register 52 (i.e., to suppress reporting any more PSC-XI hit conditions for that requester) when the I-buffer 62 no-longer contains the instruction for which the corresponding information in a PSC register 52 was generated. The PSC registers 52 are invalidated through the clear_psc signals when any of the following occurs:

Instruction branch wrong (PSC registers selectively invalidated)

Exceptional conditions, e.g., instruction stream change or interrupt (PSC registers all invalidated)

Execution unit (E-unit) 30 finished execution of an instruction (PSC registers selectively invalidated)

Each PSC register 52 is also utilized to monitor three possible invalidating conditions. First, the regular cross interrogate XI traffic from SC 200 (from a multiprocessor cache coherency protocol). Second the I-cache 50 internal least recently used (LRU) replacements (normal cache operation). Finally, the new D-cache 40 PSC-XI.

If a regular XI or LRU invalidate matches one of the PSC registers 52, a signal is transmitted from the I-cache 50 to the E-unit 30 as insn_buf_inval 97. This signal causes the central processing unit (CP) 100 to serialize at the next interruptible point, resetting, causing the I-unit 60 to discard all prefetched addresses and refetch to refill the I-buffer 62 with instructions. This reset is required in both the LRU cache handling case as well as in the regular XI multiprocessor cache coherency case because the PSC registers 52 contain only the cache congruence class address and set-ID for each prefetched address. Once a block has been invalidated or removed from the I-cache 50, the D-cache PSC-XI will not be able to match (no directory 54 hit) any of the PSC registers 52, even though there could still be prefetched instructions from that cache block in the I-buffer 62. One skilled in the art will appreciate that the PSC registers 52 could be arranged to hold the actual addresses rather than the congruence class address and set-ID. Such an embodiment would of course entail variations in the protocol handling to provide similar functionality as the preferred embodiment.

Turning now the PSC processing, to obtain further understanding of the detail in the process. At store-pretest time (after an instruction is trying to store is decoded), if the requested cache block is not found in the D-cache directory 44 or is found with read-only status, an exclusive fetch request is sent to SC 200. At the same time the D-cache 40 sends an exclusive fetch (DFAR) to SC 200, a PSC-XI is sent to the I-cache 50 with the same address. This PSC-XI usually is given the highest priority in the I-cache 50.

If, however, the I-cache 50 already has a fetch pending (IFAR) to the SC 200, and the block being fetched has the same address as the new PSC-XI, then the PSC-XI will be stalled until either the IFAR or the DFAR is returned from SC 200. This protocol is necessary to avoid missing the PSC detection if the PSC-XI and the IFAR have the same address and the PSC-XI search is performed while the IFAR request is still outstanding. To simplify the implementation, a partial address (e.g., cache congruence class only) comparison may be used between the PSC-XI address and the IFAR address, without significant performance impact. Once the PSC-XI is given priority, the I-cache directory 54 is searched and the matching entry, if any, is invalidated.

During PSC-XI cycles, the addresses in all valid PSC registers 52 are compared with the XI congruence class address and directory 54 hit set IDs. If there is any match, the corresponding PSC register 52 is invalidated and a "PSC-XI hit" signal is sent to the D-cache 40.

The D-cache 40 records the PSC hit indication in the store queue 42 entry corresponding to the store pretest request, which generated the PSC-XI. When the PSC-XI hit indication is on in the store queue 42 entry for the next store to be executed, the E-unit 30 is notified of a potential PSC hit. (This PSC-XI signal is active during the same cycle as the corresponding E-unit store request.) When this signal is on during a store instruction, the E-unit 30 forces an internal ("serialization") interruption at the end of the current instruction; this causes all prefetched instructions to be discarded and the instruction pipeline flushed, after which instruction fetching and execution is resumed at the next program instruction address.

After a PSC-XI is done in I-cache 50, we need to prevent subsequent-IFAR for the same block if the original DFAR is still outstanding. This is because the IFAR could be returned first and thus PSC checking would become premature, and thus be missed. A separate PSC-XI address register is therefore being held to remember the PSC-XI address. If any subsequent instruction fetching matches the PSC-XI address, the IFAR will be internally rejected until the SC 200 returned data (and exclusivity) to D-cache 40.

If the central processing unit 100 detected a branch-wrong condition, any pending store-queue 42 entries will be cleared while some I-buffer 62 entries might still be held valid. Since we only check for PSC during a D-cache 40 nonexclusive hit, a subsequent pretest after the branch resolution may store into those I-buffer 62 data. An I-buffer Invalid signal will therefore be sent to E-unit whenever store-queue 42 is cleared while a PSC flag is pending. The central processing unit 100 will then serialize at the next interruptible point.

Similar to the previous case, if a store-queue 42 entry is cleared while a PSC-XI is still pending in I-cache 50, to ensure PSC is checked, any new store-queue 42 entry after the "clear" will be forced to remember that a PSC-XI is still pending in I-cache 50. If any new pretest happens to store to the same block as the pending PSC-XI address, the PSC detection will not be missed.

Looking now to the processing of the storage controller (SC) 200 necessary to support the preferred embodiment in a multiprocessor system. In addition to normal processing to maintain cache coherency among multiple central processing units 100, the storage controller (SC) 200 must also provide support for PSC processing.

When the SC 200 receives a IFAR request from a CP 100, it has to send a "demote from exclusive to read-only status" XI to the fetching CP 100 even if that CP 100 currently has exclusive ownership of that block. This status change ensures that no storage update can be simultaneously executed to that block while an instruction fetch is being made from it.

When the SC 200 receives a DFAR request from a CP 100, it cannot return exclusive status to the CP 100 even if that same CP 100 currently has that block with read-only status, even if it is known to be the only CP 100 to have a copy of that block, because it is possible that the read-only copy could be in that CP's I-cache 50. If however, that CP 100 already has that block with exclusive status (as indicated in SC's 200 directory), then the SC 200 is allowed to grant the block with exclusive status to that CP 100 without doing any additional XIs. (If the block is known not to be held by any CP 100, the SC 200 will grant exclusive status for the block to the requesting CP 100 in response to such a request). If any CP 100 may have a copy of the line already, then regular XI's will be sent before any exclusive status may be granted.

Unlike traditional implementations of an additional cache coherency protocol, the disclosed embodiment reuses several existing structures currently employed to handle other cache coherency requirements. For a multiprocessor system 10 that utilizes the SC 200 to maintain cache coherency protocol between central processing units 100, there are only two additional implementation requirements. First, a new bus is needed from the D-cache 40 to the I-cache 50 to invalidate a line about to be stored. Second, the SC 200 must treat the I-cache 50 and D-cache 40 as if they were on different central processing units 100 with respect to cache coherency.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of supporting programs that include instructions that modify subsequent instructions in a processor system with a storage controller and a central processing unit including an execution unit, an instruction unit, and a plurality of caches including separate instruction cache and operand cache, the method comprising:

subjecting said instruction cache and said operand cache of said central processing unit to a cache coherency protocol with interlocks on cache block access including;

allowing shared read access by said instruction cache and said operand cache to a cache block if said cache block has read only status in said instruction cache and said operand cache;

allowing read and write access by said operand cache and preventing access by said instruction cache to said cache block if said cache block has exclusive status in said operand cache; and interlocking access to said cache block by said operand cache with exclusive status in said operand cache if said cache block has read-only status in said instruction cache;

interfacing said cache coherency protocol with a processor system cache coherency protocol employed by said storage controller, wherein said cache coherency protocol operates in cooperation with existing cache handling requirements;

buffering cache block addresses in a register-file in said instruction cache corresponding to fetched unexecuted instructions in an instruction buffer in said instruction unit;

when data is required to be stored or updated, evaluating a cache block's status for a desired storage address in said operand cache and transmitting a request for exclusive status to said storage controller and transmitting a cross interrogate signal to said instruction cache;

allowing an operand store once exclusive status is obtained front said storage controller and a response from said cross interrogate signal;

discarding and refetching data in said instruction cache if an associated cache block in said instruction cache matches said desired storage address;

when instruction fetch is requested, providing said instruction cache read-only status for a requested cache block;

discarding and refetching data in said instruction buffer and re-buffering cache locations in said register if an instruction stream of said execution unit changes;

discarding data in said instruction buffer and discarding said cache locations in said register if said execution unit completes execution of fetched instructions;

wherein said instruction cache responds to said cross interrogate signal by:

generating a response to said cross interrogate signal and a hit signal indicative of an address match if said desired storage address matches an associated cache block in said instruction cache and if a location of said associated cache block matches any valid entry in said register, otherwise responding with a no bit signal; and invalidating said associated cache block in said instruction cache if said desired storage address matches.

2. The method of claim 1 wherein said cache coherency protocol operates in cooperation with existing cache handling requirements.

3. The method of claim 1 further including discarding and refetching data in said instruction cache and in said instruction buffer, and discarding and re-buffering said cache locations in said register, of said cache handling requirement dictate.

4. The method of claim 1 wherein said exclusive status is obtained by:

following said request for exclusive status, said storage controller invalidates exclusive status for said requested cache block at any other place within said processor system; and following said request for exclusive status, said storage controller invalidates read-only status for said requested cache block at any other place within said processor system, including said central processing unit making said request.

5. The method of claim 1 wherein said instruction cache includes cache locations in said register corresponding to said fetched unexecuted instruction addresses.

6. The method of claim 1 wherein said cache handling requirements are an existing protocol that dictates when least recently utilized data in cache be replaced.

7. The method of claim 1 wherein said cross interrogate signal is employed to support probing a directory in said instruction cache with said desired storage address.

8. The method of claim 7 wherein said directory and said registers comprises six cache locations.

9. The method of claim 1 wherein said shared read access implies that both instruction and operand cache may read a target cache block.

10. The method of claim 1 wherein said exclusive status dictates sole update access to a target cache block anywhere in said processor system.

11. The method of claim 1 wherein read-only status dictates that said cache block is not held with exclusive status anywhere in said processor system.

12. The method of claim 1 wherein said processor system may be a multi-processor system including a plurality of central processing units.

13. The method of claim 12 wherein said processor system cache coherency protocol is an existing protocol that allows said central processing unit to share access to cache blocks with other central processing units of said plurality of central processing units in said processor system.

14. A system for supporting programs that include instructions that modify subsequent instructions in a processor system said system comprising:

a storage controller;

a central processing unit including an execution unit, an instruction unit, and a plurality of caches including separate instruction cache and operand cache, said central processing unit coupled to said storage controller, said execution unit coupled to said instruction unit, said instruction cache and said operand cache, said instruction unit coupled to said instruction cache and said operand cache, said instruction cache coupled to said operand cache, said processor system subjecting said instruction cache and said operand cache of said central processing unit to a cache coherency protocol with interlocks on cache block access;

wherein said subjecting includes;

said storage contoller allowing shared read access by said instruction cache, and said operand cache to a cache block if said cache block has read only status in said instruction cache and said operand cache, said storage controller allowing access by said operand cache and preventing access by said instruction cache to said cache block if said cache block has exclusive status in said operand cache, and said storage controller interlocking read and write access to said cache block by said operand cache with exclusive status in said operand cache if said cache block has read-only status in said instruction cache;

wherein said subjecting further includes interfacing said cache coherency protocol with a processor system cache coherency protocol employed by said storage controller;

wherein said subjecting further includes said cache coherency protocol operates in cooperation with existing cache handling requirements;

wherein said cache handling requirements are an existing protocol that dictates when least recently utilized data in cache be replaced;

said instruction cache buffering cache block addresses in a register-file corresponding to fetched unexecuted instructions in an instruction buffer in said instruction unit;

when data is required to be stored or updated, evaluating a cache block's status for a desired storage address in said operand cache and transmitting a request for exclusive status to said storage controller and transmitting a cross interrogate signal to said instruction cache;

said storage controller;
  allowing an operand store once exclusive status is obtained front said storage controller and a response from said cross interrogate signal;
  discarding and refetching data in said instruction cache if an associated cache block in said instruction cache matches said desired storage address;
  when instruction fetch is requested, providing said instruction cache read-only status for a requested cache block;
  discarding and refetching data in said instruction buffer and re-buffering cache locations in said register if an instruction stream of said execution unit changes; and
  discarding data in said instruction buffer and discarding said cache locations in said register if said execution unit completes execution of fetched instructions;

wherein said instruction cache responds to said cross interrogate signal by:
  generating a response to said cross interrogate signal and a hit signal indicative of an address match if said desired storage address matches an associated cache block in said instruction cache and if a location of said associated cache block matches any valid entry in said register, otherwise responding with a no hit signal; and
  invalidating said associated cache block in said instruction cache if said desired storage address matches.

15. The system of claim 14 wherein said subjecting further includes said cache coherency protocol operates in cooperation with existing cache handling requirements.

16. The system of claim 14 further including said instruction cache discarding and refetching data in said instruction cache and said instruction buffer, and discarding and re-buffering said cache locations in said register, if said cache handling requirements dictate.

17. The system of claim 14 wherein said exclusive status is obtained by:
  said storage controller, following said request for exclusive status, invalidating exclusive status for said requested cache block at any other place within said processor system; and
  said storage controller, following said request for exclusive status, invalidating read-only status for said requested cache block at any other place within said processor system, including said central processing unit making said request.

18. The system of claim 14 wherein said instruction cache includes cache locations in said register corresponding to said fetched unexecuted instruction addresses.

19. The system of claim 14 wherein said cross interrogate signal is employed to support probing a directly in said instruction cache with said desired storage address.

20. The system of claim 19 wherein said directory and said registers comprises six cache locations.

21. The system of claim 14 wherein said shared read access implies that both instruction and operand cache may read a target cache block.

22. The system of claim 14 wherein said exclusive status dictates sole update access to a target cache block anywhere in said processor system.

23. The system of claim 14 wherein read-only status dictates that said cache block is not held with exclusive status anywhere in said processor system.

24. The system of claim 14 wherein said processor system may be a multi-processor system including a plurality of central processing units.

25. The system of claim 24 wherein said processor system cache coherency protocol is an existing protocol that allows said central processor to share access to cache blocks with other central processing units of said plurality of central processing units in said processor system.

* * * * *